United States Patent [19]

Patton

[11] 4,000,795
[45] Jan. 4, 1977

[54] APPARATUS FOR CONTROLLING THE PRESSURE OF A FLUID FED TO A CLUTCH

[75] Inventor: Jon R. Patton, Jackson, Mich.

[73] Assignee: Clark Equipment Company, Buchanan, Mich.

[22] Filed: Mar. 29, 1976

[21] Appl. No.: 671,526

[52] U.S. Cl. .................. 192/109 F; 137/505.15
[51] Int. Cl.[2] ............. F16D 25/062; F16K 17/04
[58] Field of Search .................. 192/109 F, 85 R

[56] References Cited

UNITED STATES PATENTS

| | | | |
|---|---|---|---|
| 3,007,347 | 11/1961 | Gendron et al. | 192/109 F |
| 3,215,236 | 11/1965 | Pensa | 192/109 F |
| 3,618,424 | 11/1971 | Golan et al. | 192/109 F |
| 3,626,968 | 12/1971 | Hancock | 192/85 R |

Primary Examiner—Benjamin W. Wyche
Attorney, Agent, or Firm—Ernst H. Ruf

[57] ABSTRACT

A fluid pressure regulating apparatus in which a conduit means connects a source of pressure fluid to a fluid pressure operated clutch for actuating the latter and in which a valve means is interposed for controlling the pressure of fluid passing therethrough in such a manner that the fluid pressure increases from a minimum to a maximum value within a predetermined interval of time initially at the same rate as the source pressure, then at a lesser rate than the source pressure, and finally again at the same rate as the source pressure to assure shock free engagement of the clutch.

14 Claims, 2 Drawing Figures

APPARATUS FOR CONTROLLING THE PRESSURE OF A FLUID FED TO A CLUTCH

BACKGROUND OF THE INVENTION

1. Field of the Invention

The present invention relates to an apparatus for regulating the operation of fluid-pressure operated clutches. Further, the invention relates to an apparatus which may be utilized to prevent too abrupt application of hydraulic pressure to a fluid operated clutch in order to prevent shock or damage thereto or something controlled by it, for example, such as a powershift transmission.

2. Description of the Prior Art

Various apparatuses and systems have been devised heretofore to regulate or modulate the build-up of pressure in hydraulic clutch arrangements. One known arrangement is to use one or more throttling valves in the hydraulic circuit between the pressure source and the clutch device in order to restrict or limit the pressure build-up. Another previously used arrangement is to connect an accumulator in circuit between the pressure source and the clutch device. A further known arrangement is to temporarily change the setting of the pressure regulator device which is normally present in many hydraulic circuits, i.e., the pressure regulator is temporarily changed to reduce the system or line pressure during the modulation. Yet a further previous approach to the resolution of the pressure build-up problem is to modify the device which is to be actuated, as for example modifying the piston of the actuator of a multiple disc clutch so that only a portion of the piston is initially exposed to the hydraulic pressure, with the entire piston being ultimately exposed in order to provide increased force to maintain the clutch in engagement.

Examples of prior art patents which utilize one or more of these previously noted arrangements are U.S. Pat. No. 3,722,646 to Oguma; U.S. Pat. No. 3,351,170 to Hengstler; U.S. Pat. No. 3,583,422 to Dach et al; and U.S. Pat. No. 3,848,620 to Fisher et al, with the Fisher et al patent also being assigned to the assignee of the present invention.

It is the principal object of the present invention to provide a novel apparatus for controlling the pressure of fluid fed to a clutch which may be readily constructed and proportioned to regulate the pressure which is admitted to the clutch so that the pressure rises from a minimum to a maximum value within a predetermined interval of time initially at the same rate as the source pressure, then at a lesser rate than the source pressure, and finally again at the same rate as the source pressure.

SUMMARY OF THE INVENTION

In carrying out the present invention in one preferred mode, the novel apparatus of this invention includes, in combination, a reservoir; a source of pressure fluid; a fluid operated clutch; conduit means for connecting the reservoir and source with the clutch; and valve means interposed between the source and the clutch for regulating the pressure which is admitted to the clutch so that the pressure rises from a minimum to a maximum value within a predetermined interval of time. This valve means includes a housing having an elongated opening therein, with closed ends. A first closed end has bores in communication with the pressure source, the clutch, and a housing chamber, with the first closed end including a resiliently biased first valve member. Piston means are retained within the housing chamber adjacent to a second closed end, with the piston means including an annular groove portion which is in constant communication with the pressure source. The piston means also includes a fixed volume chamber in constant communication with the piston groove portion and a variable volume chamber located between the piston and the second closed end. A second resiliently biased valve member is interposed between the fixed volume and variable volume chambers and includes a restriction means so as to permit constant though limited communication between these chambers.

In operation, fluid pressure flows initially through the first closed end to the clutch at the same rate as the source pressure and flows from the fixed volume chamber through the restriction means into the variable volume chamber so as to begin to advance the piston means against the bias of a resilient means. Then, after a predetermined first time at a predetermined first pressure, the pressure fluid translates the first valve member away from the first closed end, thereby venting some of the pressure fluid passing therethrough into the chamber and out through a discharge port, thusly increasing the pressure rise in the clutch at a lesser rate than the source pressure. Finally, by the end of a predetermined second time at a predetermined second pressure, a rod portion of the piston means has physically translated the first valve member into sealing relationship with the first closed end, thereby increasing the pressure rise in the fluid pressure clutch at the same rate as the source.

The pressure controlling apparatus of this invention further includes a selector valve operatively interposed between the valve means and the reservoir, with the selector valve being movable between a plurality of positions. When the selector valve is in a position to connect the valve means to the reservoir, the pressure fluid is quickly exhausted from the fixed volume chamber thereby permitting the pressure fluid in the variable ratio chamber to exhaust therefrom by translating the second valve member away from its valve seat, with the exhausting thereof in turn permitting both the reseating of the second valve member with its valve seat and the return of the piston means into abutment with the second closed end.

Other features and advantages of the apparatus of this invention will be more readily understood by persons skilled in the art when following the detailed description in conjunction with the drawings.

DESCRIPTION OF THE PREFERRED EMBODIMENT

Figure 1:
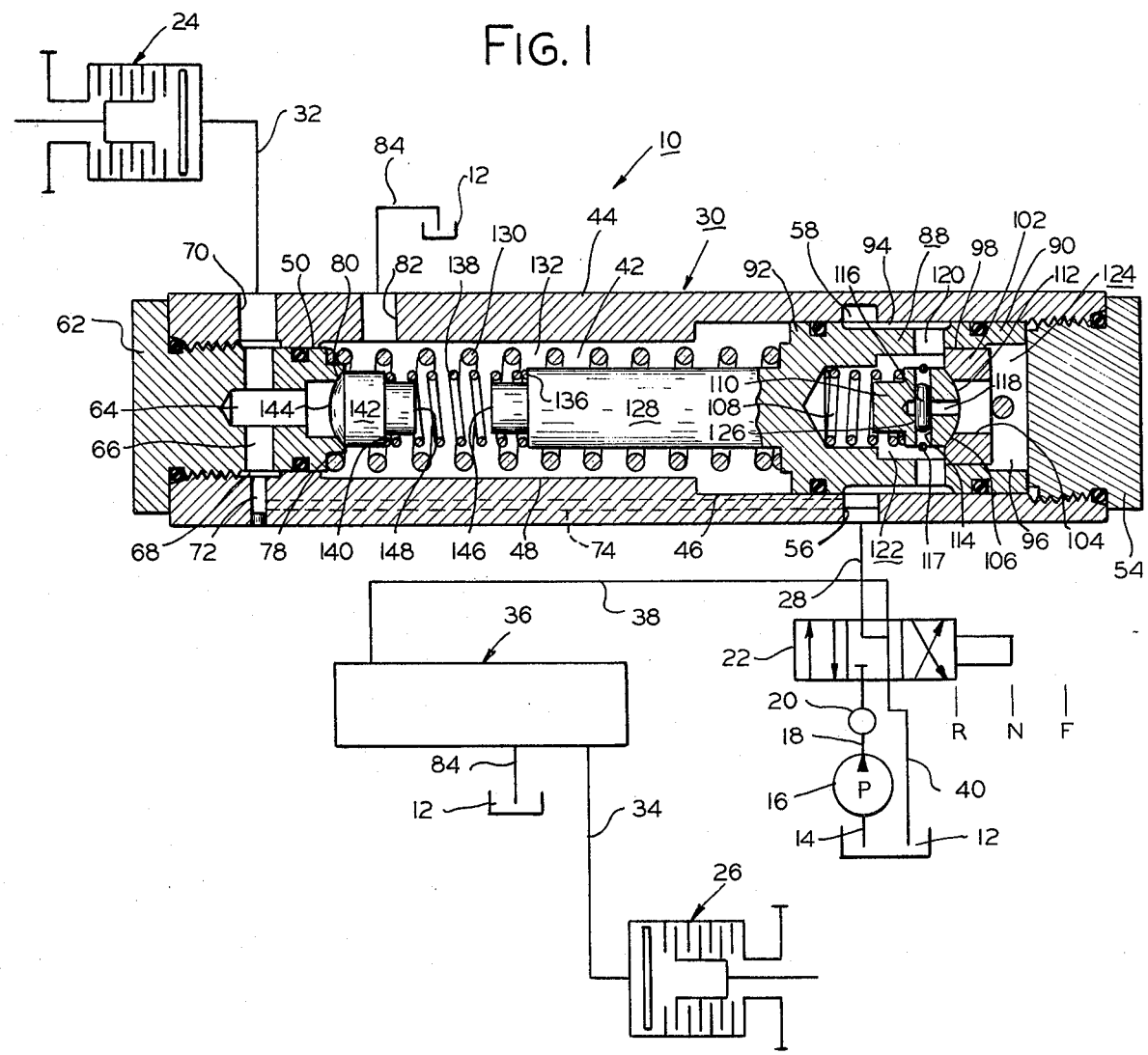
FIG. 1 shows a schematic diagram, partially in section, employing two of the clutch pressure modulator valves of this invention.

Referring now to the drawings, FIG. 1 is a diagrammatic illustration, partially in section, of a hydraulic system employing two pressure modulators which may be utilized in the actuation of the forward and reverse clutches respectively, of a powershift transmission such as is disclosed and claimed in U.S. Pat. No. 3,465,609 to Fisher et al, which patent is also assigned to the assignee of the present invention. In utilizing such clutches, it is desirable to employ a pressure which may, for example, range from 240 to 280 PSI, in order to maintain the clutches firmly in engagement during all operating conditions to which the transmission may be subjected. At the same time, however, it is desirable not to engage these clutches too abruptly but to engage them by a more gradual pressure build-up in order to minimize the shock on the gears, seals, and other component parts of the transmission.

In FIG. 1, numeral 10 generally indicates a portion of the hydraulic system of a powershift transmission, whereas numeral 12 generally indicates a hydraulic reservoir or sump from which fluid is drawn through a conduit 14 by means of a pump 16. The outlet of pump 16 discharges into a conduit 18 having a pressure regulator 20 interposed therein. Thereafter the pressurized fluid flows into a selector valve 22 of any well known construction. Valve 22 preferably takes the form of a four-way, three-position spool valve, which is shown in the neutral position. In its operative positions, valve 22 directs pressurized fluid either to the first or forward clutch indicated at 24, or the second or reverse clutch indicated at 26.

When valve 22 is moved, for example, to the right or forward position, clutch 24 is pressurized and actuated while fluid is discharged from clutch 26. When valve 22 is moved to the forward position, pressurized fluid flows through conduit 28, pressure modulator 30, and conduit 32 into forward clutch 24. When valve 22 is first moved to its forward position, fluid is discharged from clutch 26 through conduit 34, pressure modulator 36, conduit 38, valve 22, and return conduit 40 back to reservoir 12. It will be readily understood that when valve 22 is moved to its left or reverse position, clutch 26 will be pressurized and clutch 24 is drained back to reservoir 12.

The following detailed description deals only with pressure modulator 30 and the circuit or system in which it is embodied, although it will be appreciated that pressure modulator 36 is identical thereto.

Pressure modulator 30 includes an elongated housing 44 having a chamber 42 that is basically made up of coaxially intersecting bores 46 and 48, with the latter having a reduced diameter bore portion 50. A fixed closure member 54 is provided to sealingly close bore 46 on its right end. Conduit 28 is connected with bore 46 through port 56 which merges into peripheral bore groove 58.

Another fixed closure member 62 is provided to sealingly close bore 48 at its left end. Closure member 62 has an axial blind bore 64 communicable with bore 48, with blind bore 64 also being in communication with transverse closure through-bore 66. The outer ends of bore 66 merge into peripheral bore groove 68 which in turn is in communication with housing outlet port 70 and conduit 32 as well as housing orifice 72. Groove 58 and conduit 28 are connected to orifice 72 via an axial internal housing conduit that is schematically shown at 74. Thus, some of the pressurized fluid entering bore 56 is channeled, via conduit 74, orifice 72, bore 66, bore 70 and conduit 32 to clutch 24 and vice versa. The inner end of closure member 62 also has a stepped portion 78 and an annular valve seat 80.

Housing bore 48 is also provided with a radial port 82 in the area close to closure member 62, with discharge port 82 being connected to reservoir 12 via conduit 84.

Slidingly and sealingly received within housing bore 46 is a piston member 88 having first and second land portions 90 and 92 separated by axially extending annular groove portion 94, with groove portion 94 always being in communication with housing peripheral groove 58, regardless of the axial position of piston member 88.

Piston member 88 also has a stepped blind bore 96 extending thereinto from the right hand end thereof. Fixedly retained within portion 98 of bore 96 is an annular retainer member 102 having a central aperture 104 and an inner annular valve seat 106. Biased, by spring 108, into sealing relationhip with valve seat 106, is complementary sealing surface 112 of poppet 110. Poppet 110 includes a transverse through bore 114 that intersects with outwardly directed blind aperture 118. Bore 114 contains a slidable pin 116, secured against removal by a peripheral wire 117, with bore 114 and pin 116 coacting as an annular orifice 126. Extending radially through piston member groove portion 94 is a plurality of radial apertures 120, the latter serving to admit pressurized fluid from piston groove portion 94 into a fixed volume chamber 122 within piston bore 96. At the same time, orifice 126 and aperture 118 conduct fluid from chamber 122 into a variable volume chamber 124 between retainer member 102 and closure member 54.

The inner or left hand end of piston member 88 is provided with an axially extending piston rod portion 128 which extends from housing bore 46 into and partially through housing bore 48. Piston rod portion 128 serves as a guide and locator for one end and a portion of a biasing spring 130 whose other end is received in and located on stepped inner portion 78 of closure member 62. It is the function of biasing spring 130 to bias piston member 88 to the right and into engagement with closure member 54. Biasing spring 130 is located in a variable volume chamber 132 within housing 44 between closure member 62 and piston land member 92 and thus encompasses housing bore 48 and a portion of housing bore 46. Variable volume chamber 132 is of course connected to reservoir 12 via bore 82 and conduit 84.

The outer end of piston rod portion 128 is provided with a stepped portion 136 that serves to guide and confine one end of a biasing spring 138 whose other end is received on a step portion 140 of poppet 142, with the latter having a sealing surface 144, complementary with valve seat 80, in sealing contact with valve seat 80. As will be explained in more detail later, during a portion of the operation of pressure modulator 30, piston rod end surface 146 will abut poppet end surface 148 and axially translate poppet 140 until its sealing surface 144 mates with valve seat 80.

Figure 2:
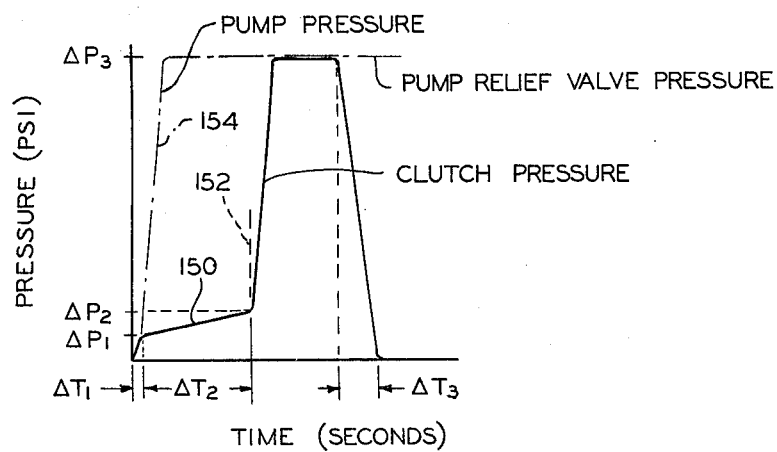
FIG. 2 is a graph showing a typical pressure-time relationship for the clutch pressure modulator valves of FIG. 1.

In operation, assuming that valve 22 has been shifted to the forward position, pressurized fluid will enter pressure modulator 30 and flow therethrough via conduits 74, 66 and 32 in a manner previously described. The clutch pressure starts to rise and at $\Delta P_7$ pressure, after time interval $\Delta T_7$ (FIG. 2), poppet 142 is forced away from valve seat 80 thereby venting the pressurized fluid into chamber 132 and therefrom back to reservoir 12 via conduit 84. Simultaneous to the pressurizing of clutch 24, pressurized fluid is ported into chamber 122, in the manner previously described, and flows therefrom, via orifice 126 and aperture 118 to the right side of piston member 88, i.e., into chamber 124. The build-up of pressure in chamber 124 causes piston member 88 to advance to the left against the bias of spring 130 at a rate determined by the size of orifice 126 and the spring rate of biasing spring 130. During time interval $\Delta T_2$, (FIG. 2), piston rod end surface 146 starts to contact poppet end surface 148 (poppet 142 at this time of course is axially away from valve seat 80) and axially translates poppet 142 until poppet sealing surface 144 mates with valve seat 80. Thus, at the end of time interval $\Delta T_2$, (as indicated by broken line 152) at pressure $\Delta P_2$, when poppet 142 is again in sealing relationship with valve seat 80, clutch pressure 150 increases at the same rate as pump pressure 154 until the pump relief valve pressure setting $\Delta P_3$ is reached.

When selector valve 22 is shifted back to its neutral or central position, conduit 28 of course becomes connected to reservoir 12 via conduit 40 and the pressurized fluid in chamber 122 is quickly exhausted therefrom and causes poppet 110 to move away from valve seat 106 so as to vent the pressurized fluid in chamber 124 back to reservoir 12. The switching of selector valve 22 of course causes a decay of clutch pressure 150 in time interval $\Delta T_3$ and further causes piston member 88 to be reset to its neutral position (FIG. 1). Once chamber 124 has been vented, poppet 110 again becomes seated against valve seat 106. It will be appreciated that the operation of pressure modulator valve 36 is the same as that for previously described pressure modulator 30 and that one of clutches 24 and 26 is pressurized and actuated while fluid is discharged from the other of these clutches.

It will also be appreciated that modifications may be made in pressure modulators 30 and 36. For example, conduit 74 need not be an internal passage within housing 44 but could rather be an external conduit that is fluidically directly connected with orifice 72. Furthermore, orifice diameters, piston diameters, and spring rates can be selected to produce various desired clutch pressure rise and clutch pressure decay slopes.

From the foregoing, it is believed that those familiar with the art will readily recognize and appreciate the novel concepts and features of the present invention. Obviously, while the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. In a pressure fluid regulating apparatus, in combination, a reservoir; a source of pressure fluid; friction engaging apparatus adapted for operation by said pressure fluid; conduit means connecting said reservoir and source with said friction engaging apparatus; and valve means interposed between said source and said friction engaging apparatus for regulating the pressure which is admitted to said friction engaging apparatus so that said pressure rises from minimum to a maximum value within a predetermined interval of time, said valve means comprising:
    a. a housing having an elongated chamber with first and second closed ends, with said chamber also having a discharge port between said closed ends and first restriction means near said first end;
    b. said first closed end having a first bore operatively connected, via said conduit means and said first restriction means, with said source of pressure fluid and, via said conduit means, with said friction engaging apparatus, said first closed end also having a second bore in communication with said first bore and said chamber, with one end of said second bore having a first annular fixed valve seat;
    c. piston means sealably and slidably guided near said second closed end, said piston means including axially spaced land portions separated by an annular groove portion, with the latter always being in communication with said source of pressure fluid via said conduit means, said piston means also having a blind bore, including a fixed volume chamber, in constant communication with said groove portion, said blind bore containing a second fixed annular valve seat and a first valve member biased into engagement therewith by first resilient means, said first valve member having second restriction means in constant communication with both said fixed volume chamber and a variable volume chamber in the portion of said housing chamber between said second valve seat and said second closed end;
    d. second resilient means between said first closed end and said piston means for biasing the latter against said second closed end, said piston means having a piston rod portion axially extending toward said first valve seat; and
    e. a second valve member biased into sealing engagement with said first valve seat by third resilient means interposed between said second valve member and said piston rod portion, whereby pressure fluid flows (1) initially through said first closed end to said friction engaging apparatus at the same rate as said source pressure and flows from said fixed volume chamber through said first valve member into said variable volume chamber so as to start to advance said piston means against the bias of said second and third resilient means; (2) after a predetermined first time at a predetermined first pressure, said pressure fluid overcomes the bias of said third resilient means and translates said second valve member away from said first valve seat, thereby venting some of said pressure fluid passing through said first closed end into said chamber and out through said discharge port, thereby increasing the pressure rise in said friction engaging apparatus at a lesser rate than said source pressure; and (3) finally after a predetermined second time at a predetermined second pressure, said piston rod portion has physically translated said second valve member into sealing relationship with said first valve seat thereby increasing the pressure rise in said friction engaging apparatus at the same rate as said source pressure until a maximum pressure value is reached.

2. The pressure fluid regulating apparatus of claim 1 further including a selector valve interposed in said conduit means between said valve means and said source, said selector valve being operatively connected with said reservoir and being movable between a plurality of positions including a first position in which said selector valve admits pressure fluid to said valve means and a second position in which said selector valve connects said valve means to said reservoir.

3. The pressure fluid regulating apparatus of claim 2 wherein, when said selector valve is in said second position and said valve means is connected to said reservoir via said conduit means, said pressure fluid is quickly exhausted from said fixed volume chamber thereby permitting said pressure fluid in said variable volume chamber to exhaust therefrom by overcoming the bias of said first resilient means and translating said first valve member away from said second valve seat, with the exhausting of said pressure fluid from said variable volume chamber in turn permitting both said first resilient means to return said first valve member into sealing relationship with said second valve seat and said second resilient means to return said piston means into abutment with said second closed end.

4. The pressure fluid regulating apparatus of claim 1 wherein said first and second restriction means take the form of first and second orifices, respectively.

5. The pressure fluid regulating apparatus of claim 1 wherein said second orifice is an annular orifice defined by a pin coacting with and being slidably engaged within a bore in said first valve member.

6. The pressure fluid regulating apparatus of claim 1 wherein said first and second valve members are poppet valves.

7. The pressure fluid regulating apparatus of claim 1 further including a second substantially similar friction engaging apparatus; a second substantially similar valve means; a selector valve interposed in said conduit means between said source and said first valve means; and second conduit means interconnecting said second valve means between said selector valve and said second friction engaging apparatus, said selector valve being movable between a plurality of positions including a first position, in which no fluid pressure is admitted into either of said valve means, and second and third positions when fluid pressure is alternately admitted into one of said first and second valve means, while the other of said first and second valve means is connected to said reservoir.

8. In a hydraulic regulating apparatus, in combination, a reservoir; a source of hydraulic fluid; a hydraulic clutch having driven elements and driving elements operative to transmit torque to driven elements in response to fluid pressure; conduit means connecting said source with said clutch; and valve means interposed between said source and said hydraulic clutch for regulating the pressure which is admitted to said hydraulic clutch so that said pressure rises from a minimum to a maximum value within a predetermined interval of time (1) initially at the same rate as said source pressure; (2) then at a lesser rate than said source pressure; and (3) finally again at the same rate as said source pressure, said valve means comprising:
  a. an elongated housing having a through chamber with first and second closed ends, said chamber having at least one inlet port, a discharge port, an outlet port and first restriction means;
  b. said first closed end having a first bore in communication with said outlet port, said outlet port communicating via said conduit means with said friction clutch, said first bore also being operatively connected with said first restriction means and in turn via said conduit means with said source of hydraulic fluid, said first closed end also having a second bore in communication with said first bore and said housing chamber;
  c. piston means sealingly and slidingly retained within said housing chamber adjacent said second closed end, said piston means including an annular groove portion which is in constant contact with said inlet port and said conduit means regardless of the position of said piston means, said piston means also having a fixed volume chamber in constant communication with said groove portion, said piston means further including a valve seat and a first valve member resiliently biased into engagement therewith, said first valve member having second restriction means in constant communication with said fixed volume chamber and a variable volume chamber in the portion of said housing chamber between said valve seat and said second closed end;
  d. resilient means between said first closed end and said piston means for biasing the latter against said second closed end, said piston means having an axial piston rod portion extending toward said first closed end; and
  e. a second valve member resiliently biased into sealing engagement with one end of said second bore, whereby fluid pressure flows initially through said first closed end to said hydraulic clutch at the same rate as said source pressure and flows from said fixed volume chamber through said second restriction means into said variable volume chamber so as to begin to advance said piston means against the bias of said resilient means; then, after a predetermined first time at a predetermined first pressure, said pressure fluid translates said second valve member away from said open end, thereby venting some of said pressure fluid passing through said first closed end into said chamber and out through said discharge port, thereby increasing the pressure rise in said hydraulic clutch at a lesser rate than said source pressure; and finally at the end of a second predetermined time at a predetermined second pressure, said piston rod portion has physically translated said second valve member into sealing relationship with said one end of said second bore, thereby increasing the pressure rise in said hydraulic clutch at the same rate as said source pressure.

9. The hydraulic regulating apparatus of claim 8 wherein said first valve member is a poppet valve that is resiliently biased into engagement with said valve seat by a spring, and said second restriction means takes the form of an annular orifice that is defined by a pin slidingly coacting with a bore in said first valve member.

10. The hydraulic regulating apparatus of claim 8 wherein said second valve member is a poppet valve that is biased into engagement with a valve seat formed on said one end of said second bore by a resilient spring interposed between said second valve member and said piston rod portion.

11. The pressure fluid regulating apparatus of claim 8 wherein said first restriction means is operatively connected with said inlet port.

12. The hydraulic regulating apparatus of claim 8 further including a selector valve operatively interposed in said conduit means between said valve means and said source and operatively connected with said reservoir, said selector valve being movable between a plurality of positions including a first position in which said selector valve admits hydraulic fluid to said valve means and a second position in which said selector valve connects said valve means to said reservoir.

13. The hydraulic regulating apparatus of claim 12 wherein, when said selector valve is in said second position and said valve is connected to said reservoir via said conduit means, said hydraulic fluid is quickly exhausted from said fixed volume chamber thereby permitting said hydraulic fluid in said variable volume chamber to exhaust therefrom by translating said first valve member away from said valve seat, with the exhausting of said hydraulic fluid from said variable volume chamber in turn permitting both said first valve member to return into sealing relationship with said valve seat and said resilient means to return said piston means into abutment with said second closed end.

14. The hydraulic regulating apparatus of claim 8 further including a second substantially similar hydraulic clutch; a second substantially similar valve means; a selector valve interposed in said conduit means between said source and said first valve means; and second conduit means interconnecting said second valve means between said selector valve and said second hydraulic clutch, said selector valve being movable between a plurality of positions including a first position, in which no hydraulic fluid is admitted into either of said valve means, and second and third positions when hydraulic fluid is alternately admitted into one of said first and second valve means, while the other of said first and second valve means is connected to said reservoir.

* * * * *